United States Patent
Mante et al.

(10) Patent No.: US 12,312,264 B2
(45) Date of Patent: *May 27, 2025

(54) METHOD FOR MIXING GAS-FREE LIQUID OXIDANT WITH PROCESS LIQUID

(71) Applicants: L'Air Liquide, Société Anonyme pour l'Etude et l'Exploitation des Procédés Georges Claude, Paris (FR); American Air Liquide, Inc.

(72) Inventors: Jan Mante, Muenster (DE); Vasuhi Rasanayagam, New Delhi (IN); Midhun Joy, Bear, DE (US)

(73) Assignees: L'Air Liquide, Société Anonyme pour l'Etude et l'Exploitation des Procédés Georges Claude, Paris (FR); American Air Liquide, Inc., Fremont, CA (US)

(*) Notice: Subject to any disclaimer, the term of this patent is extended or adjusted under 35 U.S.C. 154(b) by 730 days.

This patent is subject to a terminal disclaimer.

(21) Appl. No.: 17/366,389

(22) Filed: Jul. 2, 2021

(65) Prior Publication Data
US 2021/0331955 A1    Oct. 28, 2021

Related U.S. Application Data

(63) Continuation of application No. 15/938,870, filed on Mar. 28, 2018, now Pat. No. 11,084,744.

(51) Int. Cl.
*C02F 1/78*     (2023.01)
*B01F 23/10*   (2022.01)
(Continued)

(52) U.S. Cl.
CPC ............... *C02F 1/78* (2013.01); *B01F 23/19* (2022.01); *B01F 23/23* (2022.01);
(Continued)

(58) Field of Classification Search
CPC ........ C02F 1/78; C02F 1/20; C02F 2209/001; C02F 2209/003; C02F 2209/03;
(Continued)

(56) References Cited

U.S. PATENT DOCUMENTS 3,542,342 A   11/1970   Barron
4,252,654 A    2/1981   Leitzke et al.
(Continued)

FOREIGN PATENT DOCUMENTS

EP   0 208 253   1/1987
EP   0 561 458   9/1993
(Continued)

OTHER PUBLICATIONS

Isazadeh, S., Biosolids minimization by partial ozonation of return activated sludge: model development and bacterial population dynamics. A thesis submitted to McGill University in Partial Fulfillment of the Requirements of the Degree of Doctor of Philosophy, Department of Civil Engineering and Applied Mechanics, Montreal, Quebec, Canada, Aug. 2014, i-xxv, 1-50, 114, 169.
(Continued)

*Primary Examiner* — Bradley R Spies
*Assistant Examiner* — Jeannie Mcdermott
(74) *Attorney, Agent, or Firm* — Yan Jiang

(57) ABSTRACT

Disclosed are systems and methods for mixing a gas-free liquid oxidant with a process liquid to form a homogeneous and gas-free mixture with minimized degassing. The mixing system comprises an injection device, integrating with a pipe through which a process liquid flows, configured and adapted to inject a gas-free liquid oxidant into the process liquid, and a mixer, fluidly connected to the pipe and the injection device, configured and adapted to mix the process liquid and the gas-free liquid oxidant therein to form a homogeneous and gas-free mixture of the process liquid and
(Continued)

the gas-free liquid oxidant with minimal degassing. The method comprises the steps of a) injecting the gas-free liquid oxidant into the process liquid, and b) mixing the gas-free liquid oxidant and the process liquid to form the homogeneous and gas-free mixture. The gas-free liquid oxidant is ozone strong water.

20 Claims, 7 Drawing Sheets

(51) Int. Cl.
  *B01F 23/23* (2022.01)
  *B01F 23/237* (2022.01)
  *C02F 1/20* (2023.01)

(52) U.S. Cl.
  CPC .......... *B01F 23/237612* (2022.01); *B01F 23/237613* (2022.01); *C02F 1/20* (2013.01); *C02F 2209/001* (2013.01); *C02F 2209/003* (2013.01); *C02F 2209/03* (2013.01); *C02F 2209/40* (2013.01)

(58) Field of Classification Search
  CPC ............ C02F 2209/40; C02F 2201/784; B01F 23/19; B01F 23/23; B01F 23/237612; B01F 23/237613; B01F 23/2323; B01F 23/29; B01F 23/454; B01F 25/31322
  See application file for complete search history.

(56) References Cited

U.S. PATENT DOCUMENTS

| | | | |
|---|---|---|---|
| 5,100,521 A | 3/1992 | Schwarzl | |
| 5,275,742 A | 1/1994 | Satchell, Jr. et al. | |
| 5,487,835 A | 1/1996 | Shane | |
| 5,578,205 A | 11/1996 | Martin | |
| 5,591,349 A | 1/1997 | Ikeda et al. | |
| 5,637,231 A | 6/1997 | Hill et al. | |
| 6,146,524 A | 11/2000 | Story | |
| 6,190,436 B1 | 2/2001 | Ji et al. | |
| 6,197,091 B1 | 3/2001 | Ji et al. | |
| 6,423,235 B1 | 7/2002 | Shimoi et al. | |
| 6,461,522 B1 | 10/2002 | Pak et al. | |
| 6,464,867 B1 | 10/2002 | Morita et al. | |
| 6,485,769 B2 | 11/2002 | Audy et al. | |
| 6,712,951 B2 | 3/2004 | Andrews et al. | |
| 7,022,225 B1 | 4/2006 | Clawson et al. | |
| 9,248,415 B2 | 2/2016 | Osborn | |
| 2002/0066717 A1 | 6/2002 | Verhaverbeke et al. | |
| 2002/0110508 A1 | 8/2002 | Campo et al. | |
| 2003/0042631 A1 | 3/2003 | Nelson et al. | |
| 2005/0249631 A1 | 11/2005 | Schulz et al. | |
| 2007/0034230 A1 | 2/2007 | Gottschalk et al. | |
| 2007/0047383 A1 | 3/2007 | Williams et al. | |
| 2010/0219137 A1 | 9/2010 | Lacasse | |
| 2011/0031187 A1 | 2/2011 | Shim | |
| 2011/0186495 A1 | 8/2011 | Robinson et al. | |
| 2012/0164024 A1 | 6/2012 | Uhm | |
| 2012/0228396 A1 | 9/2012 | Osborn et al. | |
| 2013/0026110 A1 | 1/2013 | Osborn | |
| 2013/0294189 A1* | 11/2013 | Myrick | B01F 23/454 261/36.1 |
| 2015/0303053 A1 | 10/2015 | Tokoshima et al. | |
| 2016/0361693 A1 | 12/2016 | Hayashi et al. | |

FOREIGN PATENT DOCUMENTS

| | | |
|---|---|---|
| KR | 20 0256316 | 12/2001 |
| RU | 2 608 144 | 1/2017 |
| RU | 2 636 076 | 11/2017 |
| WO | WO 97 14657 | 4/1997 |

OTHER PUBLICATIONS

The Linde Group, Pure water knowledge: gases and application technologies for water treatment, Linde AG, Linde Gases Division, Unterschlessheim, Germany, 2017, 1-15.

Macauley, J.J. et al., Disinfection of swine wastewater using chlorine, ultraviolet light and ozone, Water Research, Elsevier, Jan. 2006, vol. 40, No. 10, 2017-2026.

One Water Ohio, $CO_2$ injection methods and equipment of pH control, Apr. 4, 2017, retrieved from http://www.onewaterohio.org/docs/1335.the_basics_of_carbon_dioxide_injection_methods:_dirth.pdf/, 22 pages.

Rodriguez, A. et al., Ozone-based technologies in water and wastewater treatment, Hdg Env Chem Feb. 7, 2008, vol. 5, DOI: 10.1007/698_5_103, 31 pages.

Yixing Holly Technology Co, Ltd, Fine bubble disc diffuser, Apr. 20, 2017, retrieved from http://www.hollyep.com/html/Fine%20Bubble%20Diffusers_Aerators/915, 5 pages.

International Search Report and Written Opinion for corresponding PCT/US2019/023888, Jun. 12, 2019.

International Search Report and Written Opinion for related PCT/US2019/023846, May 29, 2019.

International Search Report and Written Opinion for related PCT/US2019/023867, Jun. 11, 2019.

Egorova, G.V. et al., Ozone solubility in water, Moscow University Chemistry Bulletin, 2015, vol. 70, No. 5, 207-210.

\* cited by examiner

METHOD FOR MIXING GAS-FREE LIQUID OXIDANT WITH PROCESS LIQUID

CROSS REFERENCE TO RELATED APPLICATIONS

This application is a continuation of U.S. patent application Ser. No. 15/938,870, filed Mar. 28, 2018, the entire contents of which are incorporated herein by reference.

FIELD OF THE INVENTION

The present invention relates to methods and apparatus for mixing a gas-free liquid oxidant with a process liquid with minimal degassing, in particular, for mixing a pressurized gas-free high concentrated or saturated or close to saturated (e.g. within 10% of saturation concentration, such as 5% or 1% or 0.1%) ozone dissolved water, which under atmospheric conditions is supersaturated, with a process liquid with minimal degassing.

BACKGROUND

Liquid oxidation is used for oxidizing a compound while in solution. In a typical liquid oxidation process, an oxygen-containing gas is incorporated into liquid or contaminated liquid medium to destroy chemical contaminants in place. It can be used to remediate a variety of organic and inorganic compounds, including some that are resistant to natural degradation. One of common oxidants used in this process is ozone ($O_3$).

Ozone based oxidation treatment is common in industrial world. Ozone is being used for oxidations of several chemical compounds in pharmaceutical industries. It may also be used for bleaching substances and for killing microorganisms in air and water sources. Most of ozone reactions happen in liquid medium. Ozone being gas, it first needs to be dissolved in water or liquid medium (so-called mass transfer) and then dissolved ozone ($dO_3$) in water or liquid medium used as an oxidant to react with compounds for oxidation. In industry, dissolved ozone water or liquid medium can be used, but is not limited to, in the following areas:

- remove micro-pollutants and oxidation of hard degradable organic components in tertiary water;
- chemically attack contaminants in water (iron, arsenic, hydrogen sulfide, nitrites, complex organics and decolonization);
- disinfect water in place of chlorine, such as, drinking water, process liquid, etc.;
- provide an aid to flocculation (agglomeration of molecules, which aids in filtration, where iron and arsenic are removed);
- manufacture chemical compounds via chemical synthesis;
- wash fresh fruits and vegetables to kill yeast, mold and bacteria; and
- bleach pulp and paper.

Currently, processes of ozone dissolution, mixing and reaction for ozone based wastewater treatment take place in a single reactor, for example, in a big concrete basin in wastewater treatment plants (WWTPs). FIG. 5 is a block diagram of a common ozone reactor system designed to have all processes, dissolution (mass transfer), mixing and reaction, in a single reactor 100. In those systems the ozone gas is usually injected via bubble diffusors or pump-injector systems into the ozone reactor. Note herein that in the single reactor 100, a mixing process may or may not occur because the dissolved ozone will react with the reactants right away in the reactor. Examples of such reactors are pilot plants manufactured by Wedeco: WWTP Regensdorf & WVTP Lausanne in Switzerland, and WWTP Emscher Verbund and WWTP Duisburg in Germany. Such a system normally has a large volume (for example, 333 $m^3$) of reactor as hydraulic retention times between 20 min and 40 min are common. Depending on the different oxidation applications usual ozone dosages range between 2 g and 200 g of ozone per $m^3$ treated process liquid. In addition, the above mentioned single reactors typically operate under atmosphere pressure, around 1 bar, the undissolved ozone and oxygen in an off-gas stream from the single reactor cannot be recovered without further pressurizing, resulting a waste of ozone and/or oxygen as well as energy consumed to generate ozone in the systems.

In general, it is known the rate of dissolution of ozone in water (also called gas-to-liquid mass transfer rate) is the rate limiting step in comparison to the rate of reaction of dissolved ozone with oxidizable constituents in a process liquid. In many industry processes (e.g., use of ozone for advanced or tertiary treatment of waste water) the dissolution of ozone in water or ozone mass transfer is the time limiting step in the entire process. In addition, in many cases, because both dissolution and reaction occurs in the same reactor, these reactors are not optimized for either dissolution or the reaction process. Thus, decoupling of dissolution, mixing and reaction of ozone-injection/ozone-application equipment would lead to process flexibility and enable operation of an ozone generator under more economical and technically optimized conditions and/or enable more efficient ozone gas recycling.

There exist different types of mixers that are used in numerous applications in industries. For example, U.S. Pat. No. 3,542,342 discloses mixing pulverulent material with a liquid for making up drilling mud and how to increase its density by introducing powered barytes into the mud. More specifically, a powder or pulverulent material is mixed with a liquid in a nozzle device in which the mixing operation is assisted by a stream of gas introduced with a gas supply line. EP208253 discloses operation of a moving bed reactor, in which Carrier particles (mostly made of plastic) serve as a growth area for the microorganisms (biomass). To remove excess biomass from the carrier particles, the carrier particles are filled into a "wash tank". By adding medium- to coarse-bubble air, shear forces are applied to the carrier particles, whereby the excess biomass separates from the carrier particles and can be withdrawn from the system. EP208253 does not have intensive mass transfer from gas phase to liquid phase, but only a gentle mechanical stress of the carrier particles to separate excess biomass from the carrier particles.

SUMMARY

There is disclosed a method for mixing a gas-free liquid oxidant with a process liquid to form a homogeneous and gas-free mixture with minimized degassing, the method comprising the steps of: a). injecting the gas-free liquid oxidant into the process liquid; and b). mixing the gas-free liquid oxidant and the process liquid to form the homogeneous and gas-free mixture.

There is also disclosed the steps of adjusting flow rates of the process liquid and the gas-free liquid oxidant, respectively, to control a mixing ratio between the process liquid and the gas-free liquid oxidant.

There is also disclosed the flow rate of the gas-free liquid oxidant varies within a range of 20% to 100% of a nominal design flow rate.

There is also disclosed the flow rate of the process liquid varies within a range of 50% to 100% of a nominal design flow rate.

There is also disclosed the mixing ratio is controlled by a feed-forward control or a closed-loop control.

There is also disclosed the mixing ratio between the process liquid and the gas-free liquid oxidant ranges between 5:1 to 50:1.

There is also disclosed the process liquid and the gas-free liquid oxidant are pressurized, respectively.

There is also disclosed the pressure of the process liquid ranges between 0.1 barg and 1.6 barg.

There is also disclosed the pressure of the gas-free liquid oxidant ranges between 3 barg and 10 barg.

There is also disclosed the pressure of the gas-free liquid oxidant ranges between 4 barg and 7 barg.

There is also disclosed the pressure of the gas-free liquid oxidant is 5 barg.

There is also disclosed the pressure of the ozone strong water ranges between 3 barg and 10 barg.

There is also disclosed the pressure of the ozone strong water ranges between 4 barg and 7 barg.

There is also disclosed the pressure of the ozone strong water is 5 barg.

There is also disclosed the gas-free liquid oxidant is ozone strong water.

There is also disclosed the ozone strong water is a pressurized gas-free high-concentrated or saturated or close to saturated (e.g. within 10% of saturation concentration, such as 5% or 1% or 0.1%) dissolved ozone water which is supersaturated if at atmospheric pressure.

There is also disclosed the pressure of the ozone strong water from the mass transfer unit is maintained until the ozone strong water is injected into the process liquid, resulting a rapid dilution of the ozone strong water in the process liquid, thereby avoiding degassing.

There is also disclosed the process liquid is a liquid composed primarily of water.

There is also disclosed the process liquid is fresh water, tap water, process water, effluent water, municipal and industrial wastewater, wastewater already treated by the secondary treatment process, and the like.

There is also disclosed a method for mixing an ozone strong water with a process liquid to form a homogeneous and gas-free mixture of the ozone strong water and the process liquid with minimized degassing, the method comprising the steps of: a). injecting the ozone strong water into the process liquid; and b). mixing the ozone strong water and the process liquid to form the homogeneous and gas-free mixture.

There is also disclosed the steps of adjusting flow rates of the process liquid and the ozone strong water, respectively, to control a mixing ratio between the process liquid and the ozone strong water.

There is also disclosed a mixing system comprising: an injection device, integrating with a pipe through which a process liquid flows, configured and adapted to inject a gas-free liquid oxidant into the process liquid; and a mixer, fluidly connected to the pipe and the injection device, configured and adapted to mix the process liquid and the gas-free liquid oxidant therein to form a homogeneous and gas-free mixture of the process liquid and the gas-free liquid oxidant with minimal degassing.

There is also disclosed the injection device produces a uniform and homogeneous injection of the gas-free liquid oxidant into the process liquid with minimal degassing.

There is also disclosed the injection device produces an uniform and homogeneous injection of the ozone strong water into the process liquid with minimal degassing.

There is also disclosed the injection device includes a plurality of conduits, each extend radially through openings in the pipe and are bent along a flow direction of the process liquid in the pipe to provide an extending terminal section.

There is also disclosed the extending terminal sections of the plurality of conduits each are connected to an injection nozzle.

There is also disclosed the extending terminal sections of the plurality of conduits include a center extending terminal section placed along the axis of the pipe symmetrically surrounded by the rest of the extending terminal sections.

There is also disclosed the lengths of the extending terminal sections of the plurality of conduits are the same.

There is also disclosed the length of the center extending terminal section is longer than the same lengths of the rest of the extending terminal sections.

There is also disclosed the length of the center extending terminal section is shorter than the same lengths of the rest of the extending terminal sections.

There is also disclosed the number of the plurality of conduits ranges from 1 to 20.

There is also disclosed the number of the plurality of conduits is 5.

There is also disclosed the mixer is a static mixer.

There is also disclosed the mixer is a dynamic mixer.

Notation and Nomenclature

The following detailed description and claims utilize a number of abbreviations, symbols, and terms, which are generally well known in the art, and include:

As used herein, the indefinite article "a" or "an" should generally be construed to mean "one or more" unless specified otherwise or clear from context to be directed to a singular form.

As used herein, "about" or "around" or "approximately" in the text or in a claim means±10% of the value stated.

As used herein, "close to" or "nearly" in the text or in a claim means within 10% of the term stated. For example, "close to saturated concentration" refers to within 10% of saturated concentration.

As used herein, "quick dilusion" or "rapid dilusion" in the text or in a claim means a dilusion process occurs within approximately a few seconds, such as 2 seconds or 1 second or 0.5 second.

As used herein, the term "ozone mass transfer" is intended to refer to ozone transferred from gaseous phase to water across a gas-liquid interface.

The terms "ozone dissolution" refers to ozone gas dissolving into water, which is an alternative term of ozone mass transfer herein.

The term "ozone strong water" refers to a pressurized gas-free high concentrated or saturated or close to saturated (e.g. within 10% of saturation concentration, such as 5% or 1% or 0.1%) ozone dissolved water which is supersaturated if at atmospheric pressure. One of the applications of the ozone strong water is used as liquid oxidant.

The term "feed liquid" refers to a liquid typically composed primarily of water, such as fresh water, tap water, process water, effluent water, municipal and industrial wastewater, wastewater already treated by the secondary treatment process, or the like.

The term "process liquid" refers to a liquid typically composed primarily of water, such as fresh water, tap water, process water, effluent water, municipal and industrial wastewater, wastewater already treated by the secondary treatment process, or the like.

The term "oxidized liquid" refers to a process liquid whose non-water constituents have been oxidized partially or completely with an oxidant. Alternatively, the term "oxidized liquid" refers to a produced liquid having components that have been oxidized in a process liquid by ozone strong water. Alternatively, the term "oxidized liquid" refers in particular cases to a liquid emerging out from an oxidation process, in which various organic and inorganic constituents present in the process liquid have been converted into an oxidized form due to the action of a suitable oxidant.

The term "ozonation" refers to a water treatment process that destroys microorganisms and degrades organic and inorganic pollutants using ozone as the oxidant. Ozonation is a chemical water treatment technique based on the infusion of ozone into water. Ozonation is a type of advanced oxidation process, involving the production of very reactive oxygen species able to attack a wide range of organic and inorganic compounds and all microorganisms.

The term "ozonated water" refers to a product of ozone bubbling through water that contains levels of dissolved ozone in the water.

The term "ozone dosage" is defined as the amount of ozone in gas phase fed into the water (gram/minute).

The term "supersaturated" refers to a liquid dissolution of gas which is not stable at atmospheric conditions and would degas.

The term "homogeneous" refers to a mixture of the fluids with a mixing quality >approximately 95%. Here the mixing quality is a measure of the homogeneity or uniformity of a mixture and is calculated from statistic basic variables. The coefficient of variation is the most commonly used measure. The closer this value approximates 0 the more uniform the mixture. For visualization, it is subtracted from 1 and specified in %. Thus, 100% mixing quality (or coefficient of variation=0) refers to the best mixing condition, which, however, is practically not achievable. A mixing quality >95% is described as technically homogeneous.

The term "gas-free" refers to a liquid without visible individual bubbles and/or without detectable turbidity caused by microbubbles.

The term "nominal design flow rate" refers to the maximum flow rate for which the equipment has been designed.

Reference herein to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Ranges may be expressed herein as from about one particular value, and/or to about another particular value. When such a range is expressed, it is to be understood that another embodiment is from the one particular value and/or to the other particular value, along with all combinations within said range.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Disclosed are methods and apparatus for mixing a process liquid and a gas-free liquid oxidant to produce a homogeneous and gas-free mixture of the process liquid and the gas-free liquid oxidant without degassing occurring. The homogeneous and gas-free mixture is forwarded to a reaction unit where a liquid oxidation process takes place and the process liquid is converted into an oxidized liquid. The gas-free liquid oxidant may be ozone strong water. The ozone strong water refers to a pressurized gas-free supersaturated dissolved ozone water at atmosphere pressure or a gas-free pressurized high concentrated or saturated or close to saturated (e.g. within 10% of saturation, such as 5% or 1% or 0.1%) dissolved ozone water, which is used as a liquid oxidant. One of ordinary skill in the art will recognize that the disclosed methods and apparatus are suitable for any types of liquid oxidants or gas-liquid oxidants mixing with the process liquid. The process liquid refers to a liquid typically composed primarily of water, such as fresh water, tap water, process water, effluent water, municipal and industrial wastewater, wastewater already treated by the secondary treatment process, or the like.

Figure 1:
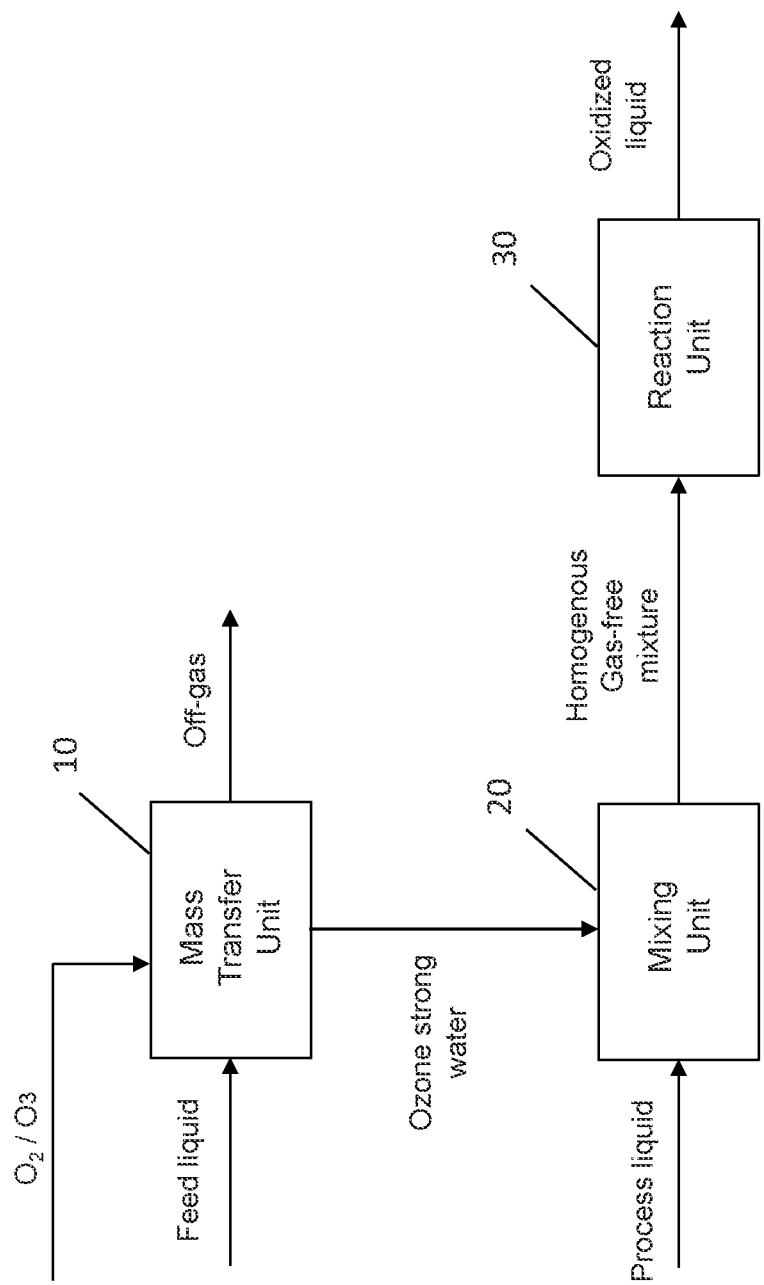
FIG. 1 is a block diagram of a decoupling system for separation of ozone oxidation process in liquid media into three unit operations for process optimization.
Figure 4:
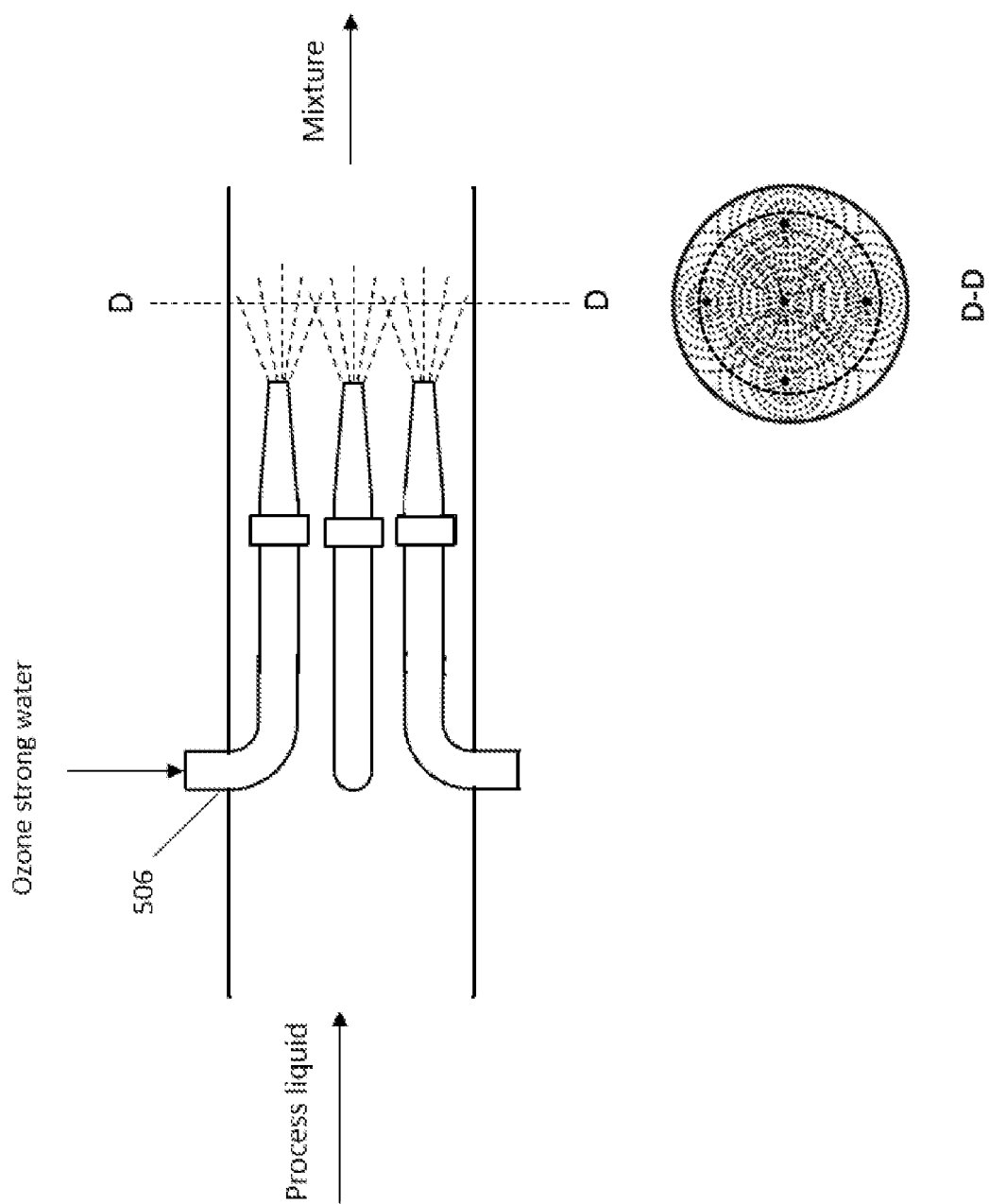
FIG. 4 is cross sectional views of an exemplary injection pattern along the axis of the pipe through which the process liquid passes and along a line D-D.
Figure 5:
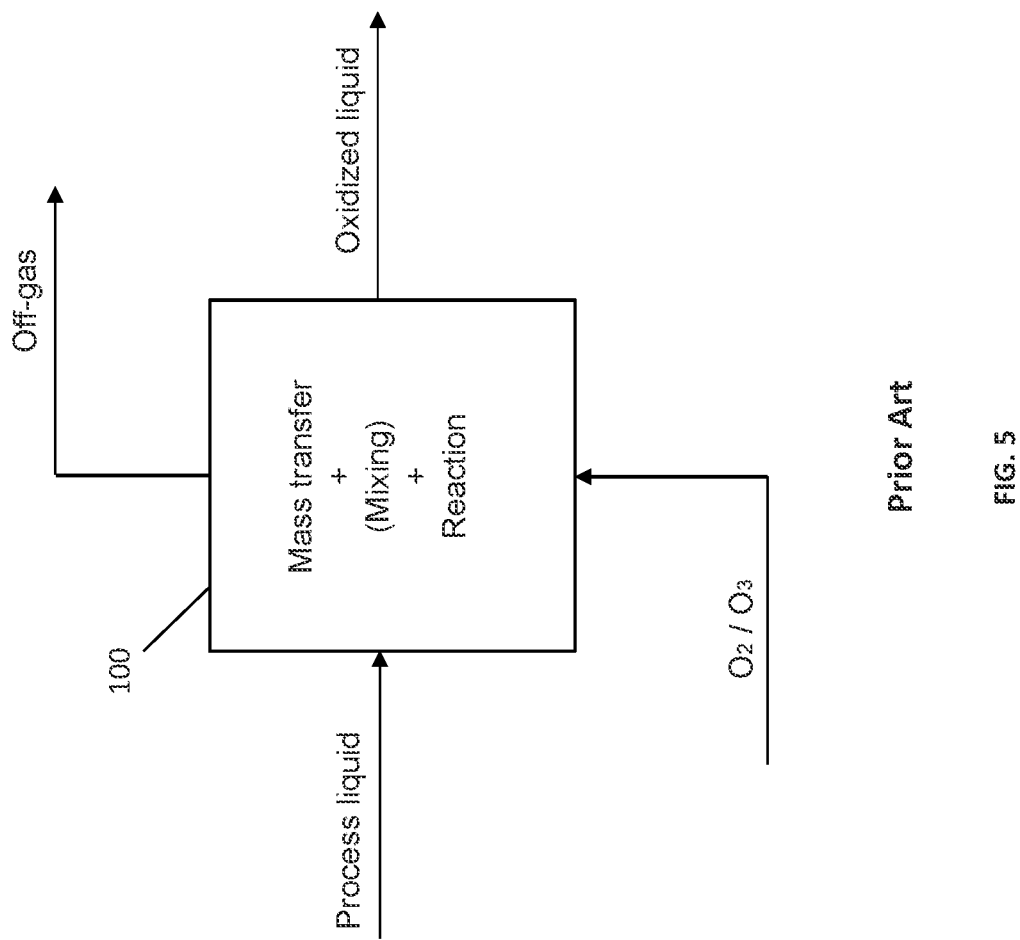
FIG. 5 is a block diagram of a common ozone reactor system designed to have all processes including dissolution (mass transfer), mixing and reaction in a single reactor.

The disclosed mixing system is a mixing unit included in a decoupling system that separates an ozone oxidation process in liquid media into three unit operations for process optimization. In many processes of using ozone for a liquid oxidation process, the treatment involves simultaneous ozone dissolution, mixing (if any) and reaction performed in a single reaction unit (e.g., as shown in FIG. 4). The disclosed mass transfer unit 10 is separated from a mixing unit and a reaction unit. As shown in FIG. 1, there is shown an embodiment of the decoupling system including a mass transfer unit 10 generating ozone strong water, a mixing unit 20 mixing the ozone strong water with a process liquid to produce a homogeneous and gas-free oxidant mixture of the ozone strong water and the process liquid, and a reaction unit 30 where a liquid oxidation process using the homogeneous and gas-free oxidant mixture takes place and the process liquid is converted into an oxidized liquid. Typically, the ozone mass transfer process running in the mass transfer unit 10 takes place approximately several tenth of minutes, for example, approximately 20 min; mixing ozone strong water with reactants in the mixing unit 20 occurs less than several seconds, for example, less than approximately 5 seconds; and reaction process happens from a few milliseconds to several minutes, for example, to approximately 5 min. The mixing unit 20 is described herein in detail.

Figure 2:
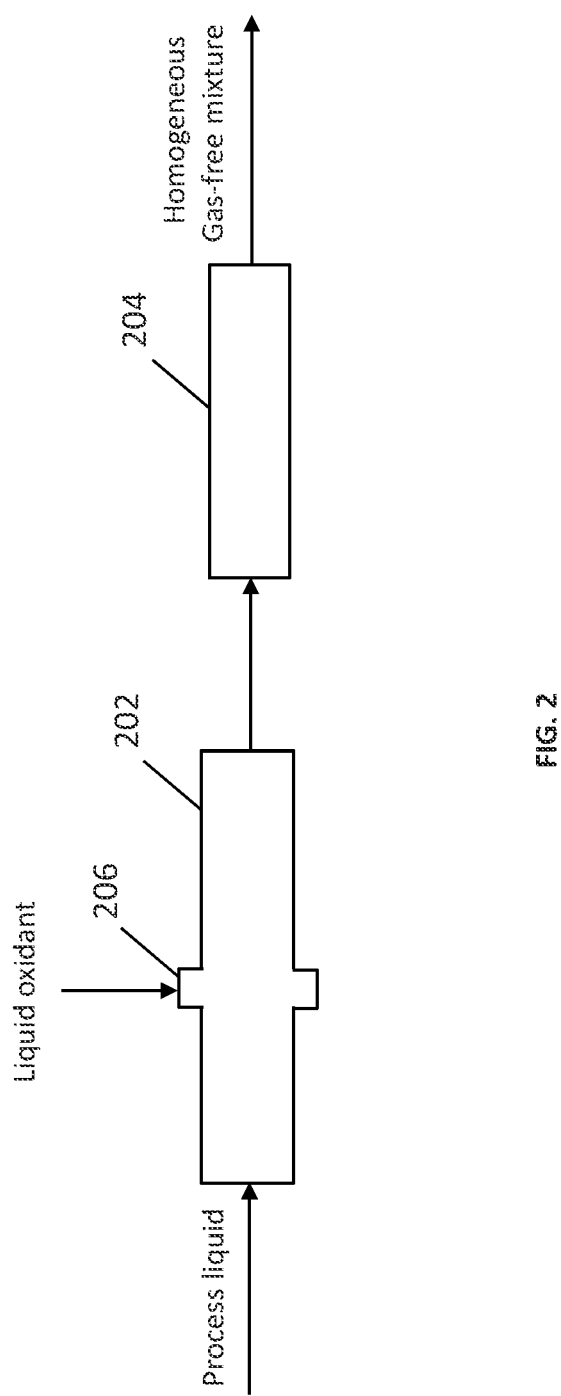
FIG. 2 is a block diagram of an exemplary embodiment of a disclosed mixing system.

Referring to the drawings, particularly to FIG. 2, there is shown an embodiment of the disclosed mixing apparatus including a pipe 202 fluidly connected to a mixer 204, where a process liquid flows through. An injection device 206 is integrated with the pipe 202 to inject a gas-free liquid oxidant into the main flow of the process liquid. The injection device 206 is a specifically designed device described in detail below. The process liquid is fed to the pipe 202 where the gas-free liquid oxidant is also injected into the pipe 202 through the injection device 206 and a mixture of the process liquid and the gas-free liquid oxidant is formed therein. The mixture of the process liquid and the gas-free liquid oxidant flows into the mixer 204, where the process liquid and the gas-free liquid oxidant are mixed homogeneously to form a homogeneous and gas-free mixture for oxidized reactions in a reaction unit where a liquid oxidation process takes place and the process liquid is converted into an oxidized liquid. The mixer 204 may be, but is not limited to, a commercially available static mixer, such as, Striko, Sulzer, Statiflow, or the like. The mixer 204 may also be, but is not limited to, a commercially available dynamic mixer. The homogeneity of the mixture of the gas-free liquid oxidant and the process liquid produced by the disclosed mixing system may be evaluated by a static mixer used herein provided by the manufacturers such as Striko, Sulzer, Statiflow or the like. The static mixer is designed for creating a homogenous mixture of the gas-free liquid oxidant and the process liquid with a mixing quality >95%. The mixture of the gas-free liquid oxidant and the process liquid produced by the disclosed mixing system is gas-free because no visible gas bubbles are observed and/or no turbidity caused by microbubbles is detected.

The entire mixing process performed in the disclosed mixing system results in minimal degassing through accurate control of flow rates and pressure of the process liquid and the gas-free liquid oxidant, respectively.

Figure 3A:
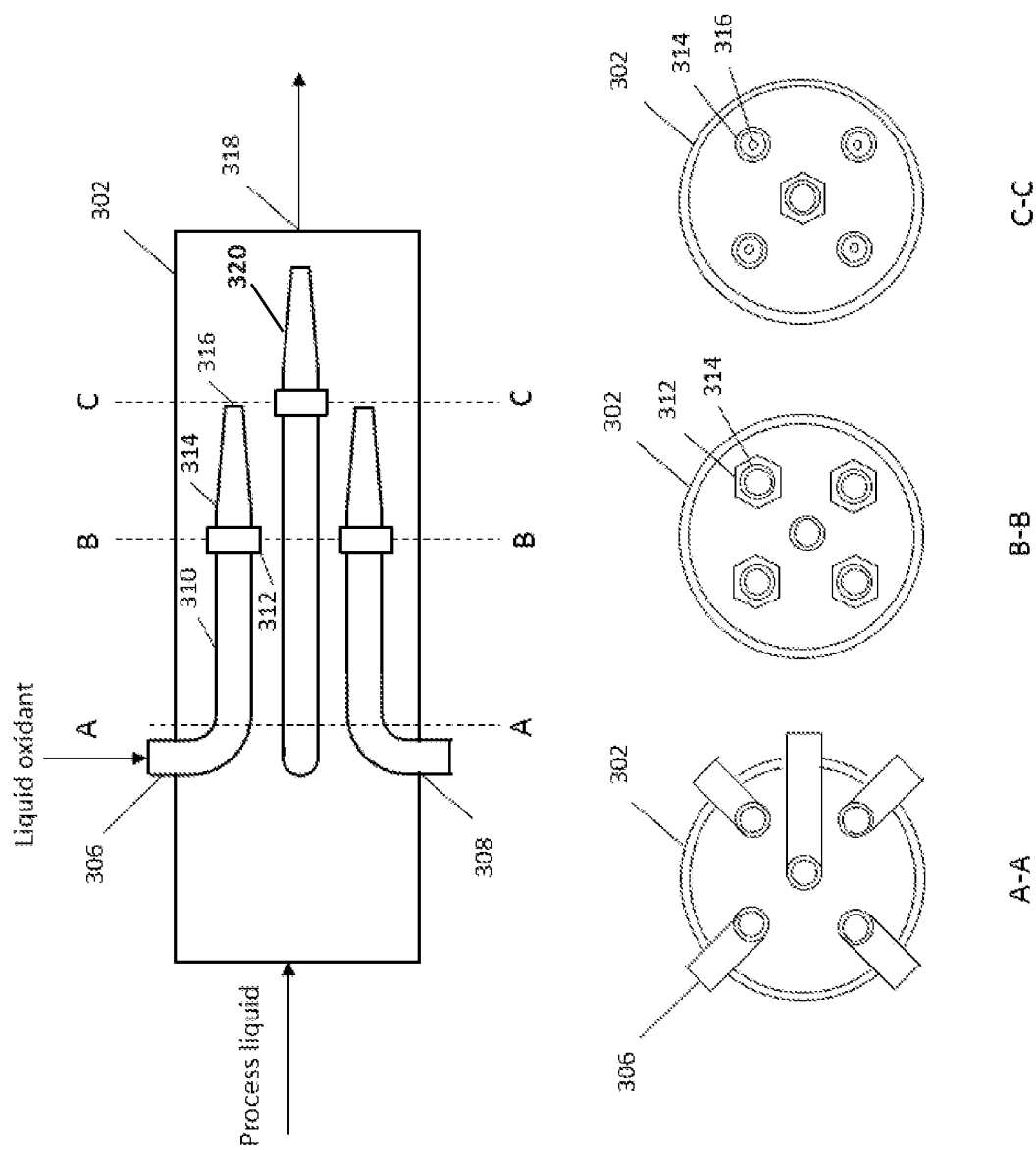
FIG. 3A is a block diagram of an exemplary embodiment of an injection device used in FIG. 2.

Referring to FIG. 3A, the top diagram, a cross sectional view along the axis of the pipe 302, the pipe 302 is a cylindrical shaped conduit. The process liquid is fed into the pipe 302 and passes through it. The flow direction of the process liquid is from the left to the right for the drawing shown in FIG. 3A. The injection device 306 includes five conduits, each extend radially through openings 308 in the pipe 302 and are bent horizontally to align with the flow direction of the process liquid to provide an extending terminal section 310. The extending terminal section 310 is connected to a liquid jet 314 having a spray nozzle 316 through a connection part 312 for directing a stream of a gas-free liquid oxidant through the pipe 302 and out through its outlet 318 into the process liquid stream in the same flow direction. The five conduits each are welded at the openings 308, respectively. Each connection part 312 may be connected to each other and/or fixed to the internal sidewall of the pipe 302 (not shown).

The bottom diagrams are cross-sectional views along lines A-A, B-B and C-C shown in the top diagram, respectively. The extending terminal section of the center conduit is axially bent along the flow direction of the process liquid. The extending terminal sections of the other four conduits are symmetrically around the extending terminal section of the center conduit 320 and their centers are placed at a circle with approximately even distance to the extending terminal section of the center conduit and to the sidewall of the pipe 302. Returning to the top diagram, the five conduits have different lengths of the extending terminal sections in the pipe 302. In this embodiment, the extending terminal section of the center conduit is longer than those of the four conduits surrounding it. The four conduits surrounding the center conduit 320 have the same lengths. In this way, the injection device 302 may be able to inject the gas-free liquid oxidant into the main flow of the process liquid evenly and homogeneously thereby suppressing degassing and reducing ozone loss. If the mixing of the gas-free liquid oxidant with the process liquid (where no dissolved ozone, e.g., concentration of $dO_3=0$ mg/l) could be achieved quickly (for example, in approximately 0.5 second), the dissolved ozone concentration in the process liquid will be lower than its saturation concentration corresponding to the flow pressure of the process liquid. This eliminates degassing during mixing.

Figure 3B:
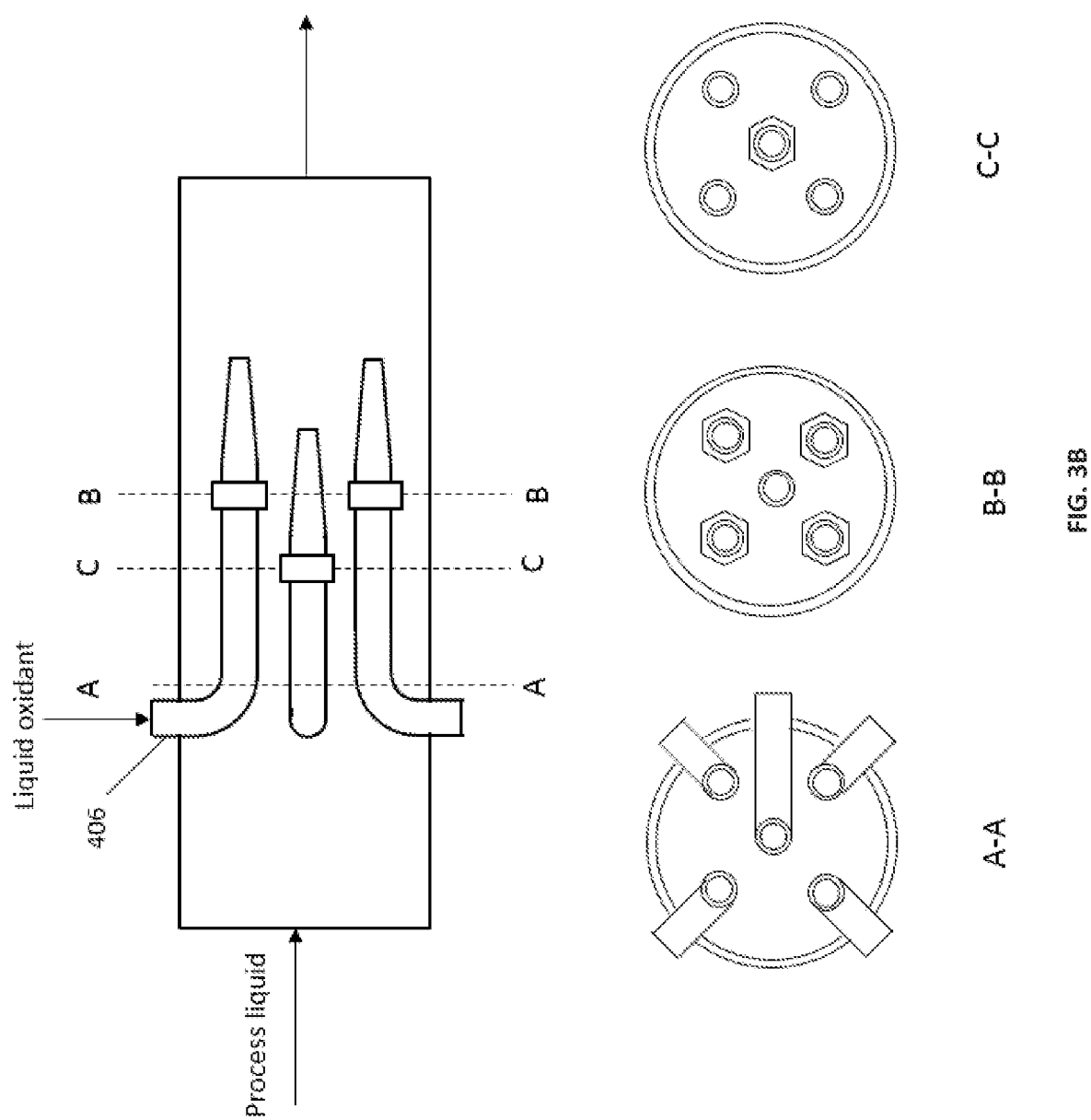
FIG. 3B is a block diagram of an alternative exemplary embodiment of an injection device used in FIG. 2.

FIG. 3B is another embodiment of the disclosed injection device. The difference between the two embodiments shown in FIG. 3A and FIG. 3B is the extending terminal section of the center conduit in FIG. 3B is shorter than those of the other four conduits surrounding it.

Figure 3C:
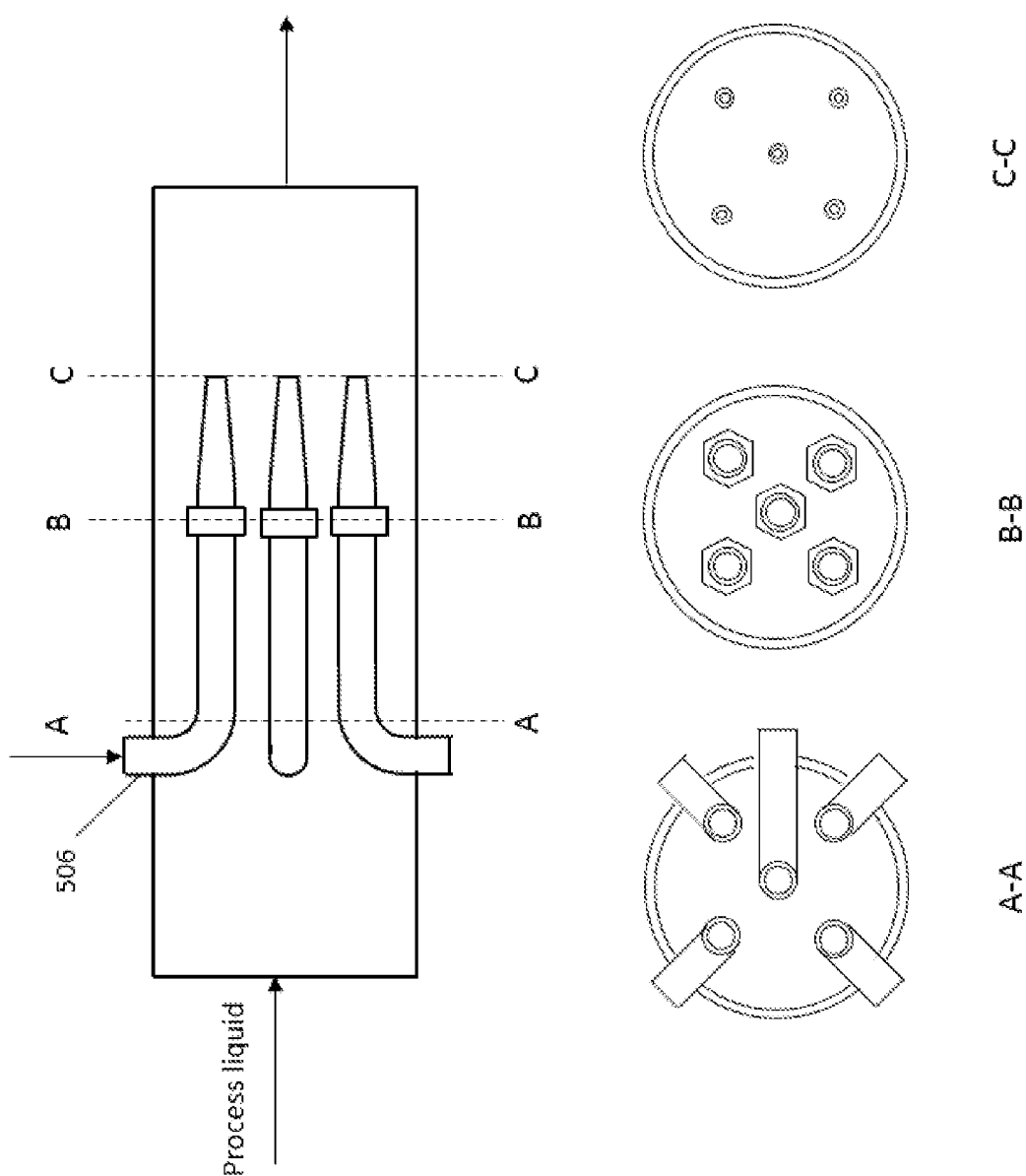
FIG. 3C is a block diagram of another alternative exemplary embodiment of an injection device used in FIG. 2.

In another embodiment of the disclosed injection device shown in FIG. 3C, the extending terminal sections of the five conduits have the same lengths.

FIG. 3A to FIG. 3C demonstrate the disclosed injection devices 306, 406 and 506, have five conduits for injecting the gas-free liquid oxidant into the process liquid. One of the ordinary skill in the art will recognize that the number of conduits is not limited to five. The number of the conduits of the disclosed injection device may range from 1 to 20 or even more, as long as their arrangement is able to inject the gas-free liquid oxidant into the process liquid evenly and homogeneously thereby suppressing degassing and reducing the loss of ozone. Preferably the number of the conduits of the disclosed injection device is 5. The diameters of the conduits in the disclosed injection device may be the same or may vary, as long as the injection device produces a homogeneous and gas-free mixture of the process liquid and the gas-free liquid oxidant. One of ordinary skill in the art will recognize that the design of the disclosed injection device is not limited to the embodiments shown in FIG. 2 to FIG. 3C, as long as the disclosed injection devices produce a homogeneous and gas-free mixture of the process liquid and the gas-free liquid oxidant without degassing (i.e., no visible gas bubbles and/or turbidity), any arrangements of the conduits are acceptable. The disclosed injection device may be used to introduce any liquid or any gas or any gas dissolved liquid into any liquid medium.

Here, the gas-free liquid oxidant disclosed in FIG. 2 to FIG. 3C may be ozone strong water generated upstream of a mass transfer unit, such as, mass transfer unit 10 shown in FIG. 1. Mass transfer unit 10 may increase the achievable steady-state concentration of ozone dissolved in water greater than approximately 150 mg/L, preferably up to approximately 200 mg/L, more preferably up to approximately 300 mg/L. The high concentration of dissolved ozone in water at elevated pressures may correspond to saturation or close to saturation concentration of dissolve ozone in water. When the pressure drops, the concentration of the dissolved ozone in water may be supersaturated. The ozone strong water is a pressurized gas-free high-concentrated or saturated or close to saturated (e.g. within 10% of saturation concentration, such as 5% or 1% or 0.1%) dissolved ozone water, which would be supersaturated if at atmospheric pressure. The pressure of the ozone strong water when forwarded from the mass transfer unit to the disclosed mixing system may range between 3 barg to 10 barg, based on operation conditions upstream of the mass transfer unit. The pressure of the process liquid forwarded to the disclosed mixing system ranges between 0.1 barg and 1.6 barg, depending on conditions downstream of the reaction unit. Once the ozone strong water is injected into the main flow of the process liquid, the ozone strong water will have been diluted by the process liquid resulting in the ozone in the ozone strong water remaining below supersaturated conditions as a consequence of the rapid dilution. That is, by injecting the ozone strong water into the process liquid, the pressurized saturated or nearly saturated ozone strong water is suffering a pressure drop due to the pressure difference between the ozone strong water and the process liquid described above. Due to this pressure drop the ozone strong water becomes supersaturated until it has been diluted by the process liquid. Thus, the injection step needs to be well controlled to achieve maximum saturated conditions for the ozone strong water, that is, a sufficient high pressure of the ozone strong water is maintained, until the ozone strong water is leaving the tip of the spray nozzle into the main flow of the process liquid with a high injection flow velocity. In this case, a rapid dilution after injecting the ozone strong water into the process liquid should be achieved to suppress the occurrence of significant ozone degassing from the ozone strong water. As the pressure in pipe 202 is low, the ozone strong water becomes supersaturated directly after being injected into the main flow of the process liquid. The high injection flow velocity and the distribution pattern of the spray nozzles 316 ensure a quick dilution of the supersaturated ozone strong water with the main flow of the process liquid.

In addition, in the disclosed mixing systems, the disclosed injection devices, such as, injection devices 306, 406 and 506, are specifically designed devices that provide an even and homogeneous mixing of the ozone strong water with the main flow of the process water. The specialized designs ensure a complete and uniform dispersion of the ozone strong water into the main flow of the process liquid throughout the entire cross-sectional area of the pipe through which the process liquid flows. As an example, as shown in FIG. 4, an injection pattern of injection device 506, shown in FIG. 3C, is nearly even and homogeneous along line D-D shown in the top diagram and the bottom diagram. Similarly, injection devices 306 and 406, as shown in FIG. 3A and FIG. 3B, are also able to produce nearly even and homogeneous injection patterns during mixing process. An even and homogeneous dispersion and/or injection of the ozone strong water into the main flow of the process liquid may be essential to guarantee a rapid dilution of the ozone strong water into the process liquid with minimal degassing during the mixing process, thereby decreasing the ozone loss.

The pressure of the produced homogeneous and gas-free mixture of the process liquid and the ozone strong water generated in the disclosed mixing system may range between 0.1 barg and 1.5 barg that depends mainly on conditions downstream of the reaction unit. A great pressure drop occurs in the disclosed mixing system. Thus, the disclosed mixing system provides a pressure transition or a pressure buffer from the mass transfer unit where high pressure ozone dissolution takes place to the reaction unit where the oxidization process is performed at around atmosphere pressure. The disclosed mixing system reduces the pressure of the ozone strong water to the pressure of the process liquid (e.g., from 6 bar to 1 bar) that avoids degassing thereby preventing ozone loss from dissolved ozone. One of ordinary skill in the art will recognize that if the pressure of the process liquid in the reaction unit may be maintained at a pressure equivalent to the pressure of the ozone strong water coming out of the mass transfer unit, and as a consequence, a mixing unit may even be omitted. For example, if the pressure of the ozone strong water is maintained at 5 barg, and the pressure of the process liquid is also maintained at 5 barg, then a mixing unit may not be needed.

The disclosed mixing system may be operated continuously. The process liquid and the gas-free liquid oxidant or ozone strong water are continuously dosed to the disclosed mixing system.

The ratio of the process liquid and the ozone strong water fed into the disclosed mixing system is defined as a mixing ratio. The mixing ratio between the process liquid and the ozone strong water varies and ranges between 5:1 to 50:1, depending on the oxidant demand in a liquid oxidation process in a reaction unit and the dissolved ozone concentration in the ozone strong water. The mixing ratio between the process liquid and the ozone strong water is controlled by a feed-forward control or a closed-loop control according to the oxidant demand in the reaction unit.

During mixing process, if nevertheless degassing occurs and small bubbles or microbubbles are created directly after the ozone strong water leaves the tip of the spray nozzle 316 shown in FIG. 3A, in this case, the ozone gas may be re-dissolved back into water again due to the mixing the stream of the process liquid and ozone strong water gets after having passed the static mixer 204 shown in FIG. 2.

The disclosed mixing systems further contemplate a method for continuously producing a homogeneous and gas-free mixture of a process liquid and a gas-free liquid oxidant for liquid oxidation process. The method comprises the steps of:
  a) injecting the gas-free liquid oxidant into the process liquid; and
  b) mixing the gas-free liquid oxidant and the process liquid to form the homogeneous and gas-free mixture.

Furthermore, the step of a) comprises the steps of adjusting flow rates of the process liquid and the gas-free liquid oxidant, respectively, to control a mixing ratio between the process liquid and the gas-free liquid oxidant.

Herein the gas-free liquid oxidant may be, but is not limited to, ozone strong water. In addition, the process liquid and the gas-free liquid oxidant are pressurized. The pressure of the process liquid ranges between 0.1 barg and 1.6 barg and the pressure of the gas-free liquid oxidant ranges between 3 barg and 10 barg. The mixing ratio between the process liquid and the gas-free liquid oxidant ranges between 5:1 to 50:1. The mixing ratio is controlled by a feed-forward control or a closed-loop control. A flow rate of the gas-free liquid oxidant, such as, the ozone strong water, varies within a range of 20% to 100% of a nominal design flow rate. A flow rate of the process liquid varies within a range of 50% to 100% of a nominal design flow rate. Here, the nominal design flow rate refers to the maximum flow rate for which the disclosed mixing system has been designed. In addition, the mixer may be, but is not limited to, a commercially available static mixer.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method for mixing an ozone strong water with a process liquid to form a homogeneous and gas-free mixture of the ozone strong water and the process liquid with minimized degassing, the method comprising the steps of:
    a) maintaining a pressure of the ozone strong water until the ozone strong water is injected into a main flow of the process liquid;
    b) injecting the ozone strong water into the main flow of the process liquid via one more spray nozzles oriented in a direction parallel to the direction of the main flow of the process liquid to rapidly dilute the ozone strong water in the process liquid, thereby avoiding degassing,
    wherein the ozone strong water is a pressurized gas-free high concentrated or saturated or close to saturated ozonated water, which under atmospheric conditions is supersaturated,
    wherein said pressure of the ozone strong water is higher than a pressure of the process liquid; and
    c) mixing the diluted ozone strong water and the process liquid to form the homogeneous and gas-free mixture.

2. The method of claim 1, wherein the step of b) includes the steps of:
    adjusting flow rates of the ozone strong water and the process liquid, respectively, to control a mixing ratio between the process liquid and the ozone strong water.

3. The method of claim 2, wherein the flow rate of the ozone strong water varies within a range from 20% to 100% of a nominal design flow rate of equipment for the ozone strong water.

4. The method of claim 2, wherein the flow rate of the process liquid varies within a range from 50% to 100% of a nominal design flow rate of equipment for the process liquid.

5. The method of claim 2, wherein the mixing ratio between the ozone strong water and the process liquid is controlled by a feed-forward control or a closed-loop control.

6. The method of claim 2, wherein the mixing ratio between the ozone strong water and the process liquid ranges between 5:1 to 50:1.

7. The method of claim 1, wherein a concentration of ozone dissolved in water in the ozone strong water is greater than approximately 150 mg/L.

8. The method of claim 1, wherein a concentration of ozone dissolved in water in the ozone strong water is up to approximately 300 mg/L.

9. The method of claim 1, wherein a concentration of ozone dissolved in water in the ozone strong water ranges from approximately 150 mg/L to approximately 300 mg/L.

10. The method of claim 1, wherein the pressure of the ozone strong water ranges between 3 barg and 10 barg.

11. The method of claim 1, wherein a pressure of the process liquid ranges between 0.1 barg and 1.6 barg.

12. The method of claim 1, wherein the step c) occurs within approximately 0.5 second.

13. A method for mixing a gas-free ozone dissolution with a process liquid to form a homogeneous and gas-free mixture with minimized degassing, the method comprising the steps of:
    a) maintaining a pressure of a gas-free liquid oxidant until the gas-free liquid oxidant is injected into a main flow of the process liquid,
    wherein the gas-free ozone dissolution is a pressurized gas-free high concentrated or saturated or close to saturated ozonated water, which under atmospheric conditions is supersaturated,
    wherein said pressure of the gas-free ozone dissolution is higher than a pressure of the process liquid;
    b) injecting the gas-free ozone dissolution into the main flow of the process liquid via one or more spray nozzles oriented in a direction parallel to the direction of the main flow of the process liquid to rapidly dilute the gas-free ozone dissolution in the process liquid, thereby avoiding degassing; and
    c) mixing the diluted gas-free ozone dissolution and the process liquid to form the homogeneous and gas-free mixture.

14. The method of claim 13, wherein the step of b) includes the steps of:
    adjusting flow rates of the gas-free ozone dissolution and the process liquid, respectively, to control a mixing ratio between the process liquid and the gas-free ozone dissolution.

15. The method of claim 14, wherein the mixing ratio between the gas-free ozone dissolution and the process liquid ranges between 5:1 to 50:1.

16. The method of claim 13, wherein a pressure of the process liquid ranges between 0.1 barg and 1.6 barg.

17. The method of claim 13, wherein said pressure of the gas-free ozone dissolution ranges between 3 barg and 10 barg.

18. The method of claim 13, wherein a concentration of dissolved ozone in the gas-free ozone dissolution is greater than approximately 150 mg/L.

19. The method of claim 13, wherein a concentration of dissolved ozone in the gas-free ozone dissolution ranges from approximately 150 mg/L to approximately 300 mg/L.

20. The method of claim 13, wherein the step c) occurs within approximately 0.5 second.

* * * * *